United States Patent
Pierrot, III

[11] 3,713,467
[45] Jan. 30, 1973

[54] DELIMBING BLADE

[75] Inventor: Victor Charles Pierrot, III, Dubuque, Iowa

[73] Assignee: Deere & Company, Moline, Ill.

[22] Filed: April 26, 1971

[21] Appl. No.: 137,153

[52] U.S. Cl. .................................................144/2 Z
[51] Int. Cl. ..............................................A01g 23/02
[58] Field of Search .......144/2 Z, 3 D, 34 R, 309 AC

[56] References Cited

UNITED STATES PATENTS 3,461,926    8/1969    Larson...................................144/2 Z

FOREIGN PATENTS OR APPLICATIONS 1,935,414    1/1970    Germany ..............................144/2 Z Primary Examiner—Gerald A. Dost
Attorney—H. Vincent Harsha, Harold M. Knoth, William A. Murray, John M. Nolan and Jimmie R. Oaks

[57] ABSTRACT

Delimbing blades are adapted to be driven lengthwise of a tree stem for removing the limbs from the stem by impact. The blades are curved to fit closely to a tree stem and the trailing portions of the blades are offset in a direction which disposes them farther outwardly from a stem being delimbed than the leading portions of the blades. The offsets define reliefs which permit the leading portions of the blades to return to cutting positions next to the stem while the blades are passing over swells at the bases of limbs which have just been cut.

2 Claims, 3 Drawing Figures

INVENTOR.
VICTOR C. PIERROT, III

DELIMBING BLADE

BACKGROUND OF THE INVENTION

The present invention relates to a novel delimbing blade and more particularly relates to a blade of the type which is driven lengthwise of a tree stem to cut limbs therefrom by impact.

Blades of this type are usually pivotally mounted two or more on a blade carriage and are biased toward engagement with a tree stem by means which permit the blades to follow irregularities along the stem as well as accommodate for the taper of the stem from its base to its top.

These blades are usually in the form of curved plates which are necessarily broad to withstand the great forces they incur when they impact a tree limb. In known blades of this type, the entire inner surface of the blade is smooth. Therefore, when the leading portion is riding over a swell, as exists at the base of most tree limbs, the entire inner surface of the blade will likewise contact the swell and keep the blade disposed outwardly from the tree stem. If a second stem is encountered before the blade has passed completely over the swell, the second stem will be cut at a point outwardly of its base, thus leaving a stub. Limb stubs continue to be left until the trailing edge of the blade passes over the stub of the last cut limb before the leading edge of the blade reaches the next limb to be cut.

SUMMARY OF THE INVENTION

According to the present invention, there is provided a novel delimbing blade which will closely follow a tree stem during cutting operation.

It is an object of the invention to provide a delimbing blade having a relieved portion permitting the passage of a limb swell beneath the trailing portion of the blade while permitting the leading portion of the blade to return to a desirable cutting level relative to the tree stem. Specifically, it is an object of the invention to provide a delimbing blade having a trailing portion which is stepped from the leading portion in a direction which will dispose the trailing portion farther outwardly from a tree stem being delimbed than the leading portion.

These and other objects will be apparent from the ensuing description and the appended drawings.

BRIEF DESCRIPTION OF THE DRAWINGS

FIG. 3 is a view showing a prior art blade and the blade of the present invention in section and illustrating their respective positions when delimbing two consecutive tree limbs spaced along the tree stem a distance lesser than the widths of the blades.

DESCRIPTION OF THE PREFERRED EMBODIMENT

Figure 1:
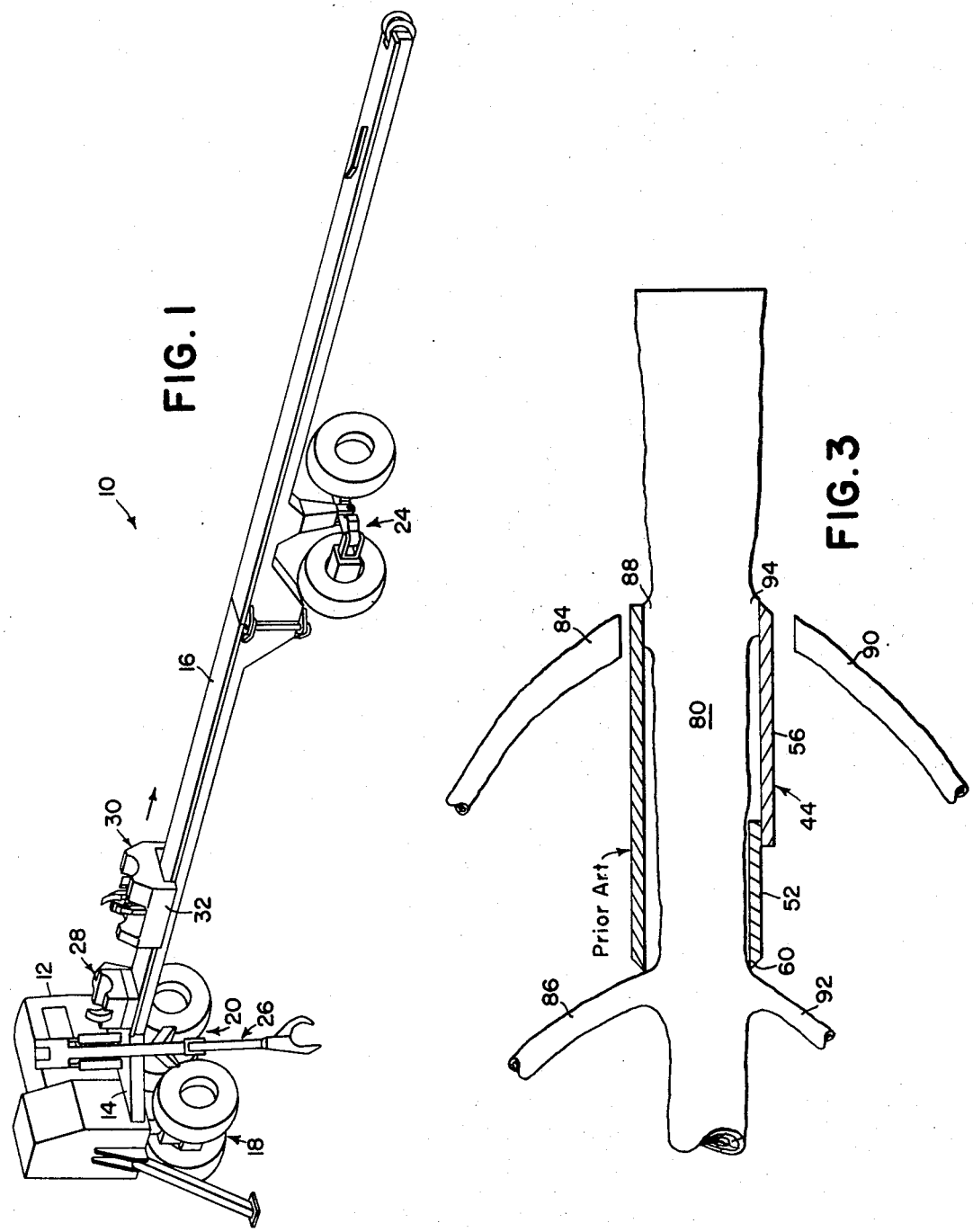
FIG. 1 is an overall perspective view of a delimbing machine of the type in which the present invention may be embodied.

Referring now to the drawings, there is shown a generally T-shaped, self-propelled delimbing machine 10. The machine 10 includes a power unit 12 forming the head of the machine and having a horizontal frame 14 to which is fixed one end of an elongate, horizontal delimbing platform 16, forming the leg of the machine. The power unit 12 is supported on a pair of dual-wheel assemblies 18 and 20, located under the opposite ends of the frame 14 and a third wheel assembly 24 is located intermediate the ends of the platform 16.

A boom and grapple assembly 26 for selectively placing tree stems along the top of the platform 16 is mounted on the frame 14 adjacent the near end of the platform 16, relative to the power unit 12. A retainer-ejector 28 for receiving tree stems from the boom and grapple assembly 26 and holding the stems in position for delimbing and for then ejecting the delimbed stems to one side of the platform 16, is mounted on the near end of the platform 16.

A delimbing blade carriage 30 is mounted for guided movement along the top of the platform 16 and a reversible drive means, not shown, is operatively coupled to the carriage 30 for moving the latter between the opposite ends of the platform 16.

The carriage 30 includes a main frame 32 overlying and having skirts straddling the platform 16. The carriage 30, as viewed by an observer at the power unit 12, has a first blade-carrying arm 34 pivotally mounted for swinging about a fore-and-aft extending pin 36 at the right side of the frame 32. A second blade-carrying arm 38 is pivotally mounted for swinging about a fore-and-aft extending pin 40 at the left side of the frame 32.

Figure 2:
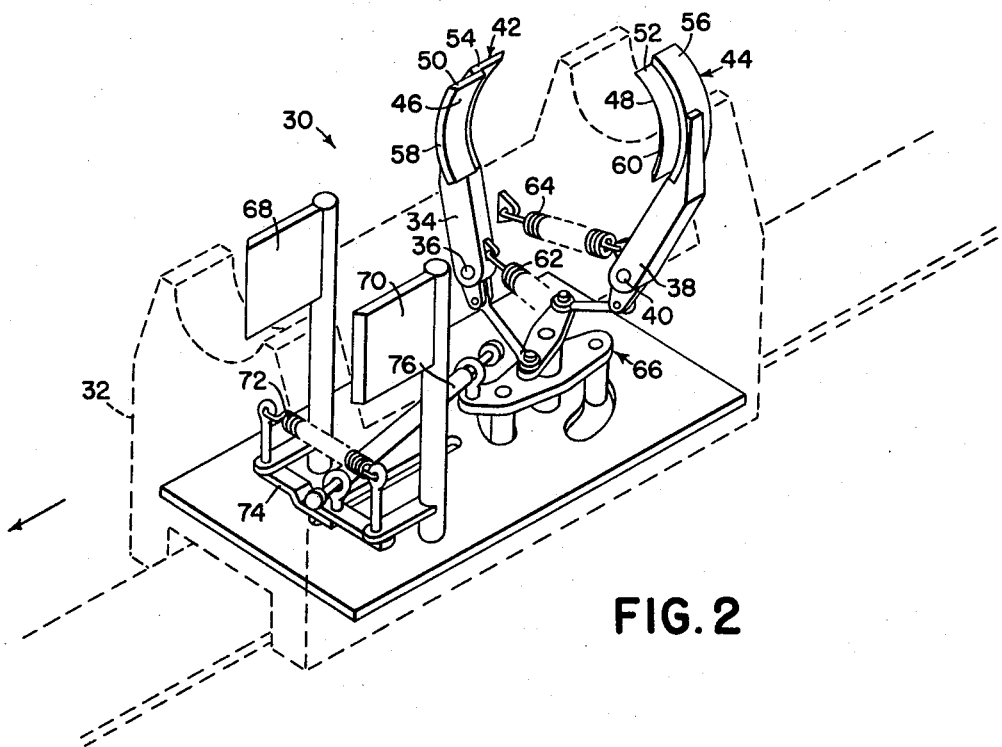
FIG. 2 is a perspective view of a delimbing blade carriage showing delimbing blades, constructed according to the present invention, mounted thereon, the carriage frame being shown only in dashed outline.

A pair of generally opposed, curved delimbing blades 42 and 44 are respectively fixed to the outer ends of the arms 34 and 38 and respectively have concave surfaces 46 and 48 disposed for embracing a portion of the circumference of a tree stem extending longitudinally between the blades 42 and 44. With reference to traveling in the direction of the arrows in FIGS. 1 or 2, the blades 42 and 44 respectively include leading portions 50 and 52 and trailing portions 54 and 56. The leading blade portions 50 and 52 respectively have leading cutting edges 58 and 60. The leading ends of the trailing blade portions 54 and 56 respectively overlap and are fixed, as by weldments, to the trailing ends of the leading blade portions 50 and 52. Thus, when the leading blade portions 50 and 52 are in embracing engagement with a tree stem, the trailing blade portions 54 and 56 will be spaced from the tree stem a distance equal to the thicknesses of the leading blade portions 50 and 52.

For the purpose of biasing the blades 42 and 44 toward engagement with a tree stem being delimbed, a first tension spring 62 has its opposite ends connected to the frame 32 and the arm 34 and a second tension spring 64 has its opposite ends connected to the frame 32 and the arm 38. A control linkage indicated generally at 66 is operatively connected for swinging the arms 34 and 38 apart for opening the blades 42 and 44 in a manner fully described in copending application Ser. No. 137,155, filed by the instant applicant on even date with the instant application.

Also disclosed and described in detail in the aforementioned copending application are a pair of topping blades 68 and 70 which are biased to a topping position by a spring 72 and which are controlled by an over-center linkage 74 which is moved to opposite sides of the "on center" position by a control rod and collar means 76 interconnecting the control linkage 66 and the overcenter linkage 74.

The advantage of the delimbing blade of the present invention can clearly be seen in the illustration in FIG. 3 wherein there is shown a segment of a tree stem 80 having at its upper side a cross section of a prior art blade and having at its lower side a cross section of the blade 44. As is apparent, the prior art blade has just cut a limb 84 and is just engaging a limb 86 to be cut next. The prior art blade is riding on a swell 8 which was at the base of the limb 84 and it is apparent that the limb 86 will be severed a distance from the stem 80 equal to the swell height plus the change in the stem radius due to the taper of the tree. Thus, the prior art blade will remain at least this distance from the stem 80 until the next limb to be cut is spaced far enough to permit the blade to clear the stem just cut. It is also apparent that the blade 44 too has just cut a limb 90 and is just engaging a limb 92 to be cut next. In this case, the trailing blade portion 54 of the blade 34 is riding on a swell 94 that was at the base of the limb 90. However, the leading portion 52 of the blade 44 is properly disposed to cut the limb 92 at its base adjacent the stem 80. Thus, it can be seen that even though the leading blade portion 52 may ride up on a swell at the base of a limb, it will clear the swell before the cutting edge 60 reaches the next limb to be cut, when the stem has normally spaced limbs.

I claim:

1. A delimbing blade adapted for being biased into engagement with and for being quickly advanced along a tree stem for cutting the limbs therefrom by impact, comprising: leading and trailing plate-like members of equal thickness having concave inner surfaces adapted for operating adjacent a tree stem and having convex outer surfaces; said leading member having a leading cutting edge; and the leading portion of the concave surface of the trailing member engaging and being rigidly fixed to the trailing portion of the convex surface of said leading member whereby said concave surface of said trailing member is offset outwardly from the concave surface of said leading member relative to a stem being delimbed.

2. A delimbing blade adapted for being biased into engagement with and for being quickly moved along a tree stem for cutting the limbs therefrom by impact, comprising: first and second concavo-convex plate-like members of equal thickness having respective leading and trailing edges relative to the direction of movement of the members during delimbing operation; the leading edge of said first member being a cutting edge; said first and second members respectively having complementary convex and concave surfaces; and said first and second members respectively having trailing and leading end portions overlapped and fixed together.

* * * * *